United States Patent
Monereau et al.

(10) Patent No.: US 6,224,651 B1
(45) Date of Patent: May 1, 2001

(54) PROCESS FROM SEPARATION OF A GAS MIXTURE BY PRESSURE SWING ADSORPTION AND PLANT FOR ITS IMPLEMENTATION

(75) Inventors: Christian Monereau, Paris; Yves Engler, Vincennes; Guillaume De Souza, Issy les Moulineaux; Pierre Olivier Dolle, Paris, all of (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/365,776

(22) Filed: Aug. 3, 1999

(30) Foreign Application Priority Data

Aug. 4, 1998 (FR) .................................... 98 09998

(51) Int. Cl.$^7$ .................................. B01D 53/047
(52) U.S. Cl. .......... 95/19; 95/25; 95/96; 95/116; 96/116; 96/117.5; 96/130; 96/143
(58) Field of Search .................. 95/19, 21, 22, 95/96–105, 25, 116, 127, 130, 138–140, 143; 96/108, 116, 130, 139, 140, 143, 117.5

(56) References Cited

U.S. PATENT DOCUMENTS

| | | | |
|---|---|---|---|
| 3,430,418 | * | 3/1969 | Wagner ............................. 95/100 |
| 3,564,816 | * | 2/1971 | Batta ................................. 95/100 |
| 3,636,679 | * | 1/1972 | Batta ................................. 95/100 |
| 3,717,974 | * | 2/1973 | Batta ................................. 95/98 |
| 3,738,087 | * | 6/1973 | McCombs ......................... 95/98 |
| 4,234,322 | * | 11/1980 | DeMeyer et al. .................. 95/19 |
| 4,299,595 | * | 11/1981 | Berkmann et al. ............... 95/19 X |
| 4,360,362 | * | 11/1982 | Asztalos ........................... 95/96 X |
| 4,472,177 | * | 9/1984 | Sircar .............................. 95/98 X |
| 4,475,929 | * | 10/1984 | Fuderer ............................. 95/97 |
| 4,834,780 | * | 5/1989 | Benkmann ......................... 95/98 |
| 5,441,558 | | 8/1995 | Lee et al. .......................... 95/100 |
| 5,733,359 | * | 3/1998 | Doong et al. ................... 95/101 X |

FOREIGN PATENT DOCUMENTS

| | | |
|---|---|---|
| 195 06 762 | 1/1996 | (DE) . |
| 0 011 872 | 6/1980 | (EP) . |
| 0 819 463 | 1/1998 | (EP) . |

* cited by examiner

Primary Examiner—Robert H. Spitzer
(74) Attorney, Agent, or Firm—Young & Thompson

(57) ABSTRACT

A process for separation of a gas mixture by pressure swing adsorption, in which a pressure swing cycle comprising a sequence of steps which define adsorption, decompression/regeneration and pressure rise phases is employed for the or each adsorber. The cycle furthermore comprises at least temporarily at least one step of isolating the adsorber (II; IV) during which the pressure variation in the isolated adsorber is recorded.

16 Claims, 3 Drawing Sheets

PROCESS FROM SEPARATION OF A GAS MIXTURE BY PRESSURE SWING ADSORPTION AND PLANT FOR ITS IMPLEMENTATION

FIELD OF THE INVENTION

The invention related to a process for separation of a gas mixture by pressure swing adsorption, in which a pressure swing cycle comprising a sequence of steps which define adsorption, decompression/regeneration and pressure rise phases is employed for the or each adsorber.

The invention can be implemented with all types of pressure variation adsorption cycles, for example the following cycles:

So-called VSA (vacuum swing adsorption) cycles, in which the adsorption is carried out substantially at atmospheric pressure and the minimum pressure of the cycle is much lower than this atmospheric pressure and typically of the order of 250 to 500 mb. These cycles are generally implemented using units with three adsorbers;

So-called MPSA transatmospheric cycles, which differ from the previous ones by the fact that the adsorption is carried out at a pressure much higher than atmospheric pressure and typically of the order of 1.3 to 2 bar. These cycles are generally implemented using units with two adsorbers;

So-called PSA (pressure swing adsorption) cycles, in which the adsorption is carried out at a pressure much higher than atmospheric pressure, typically of the order of 3 to 50 bars, while the minimum pressure of the cycle is substantially equal either to atmospheric pressure or to a pressure of a few bar.

The latter application will be referred to below and the abbreviation PSA will be used as a generic term to describe all these cycles. Furthermore, the pressures indicated are absolute pressures.

The expression "pressure swing adsorption" or PSA is intended here to mean the various cycles which have been proposed for producing, for example, hydrogen from a steam reforming synthesis gas by substantially isothermal selective adsorption, with the pressure of each adsorber varying between a high pressure and a low pressure. The high pressure of the cycle may be greater than or equal to atmospheric pressure, whereas the low pressure of the cycle may be equal to or less than atmospheric pressure. These processes include various combinations of steps of adsorption, decompression/regeneration and recompression of the adsorbers.

Furthermore, in what follows, the terms "inlet" and "outlet" denote the inlet and outlet ends of an adsorber in the adsorption phase; the expression "cocurrent" denotes the flow direction of the gas in the adsorber during this adsorption phase; and the expression "countercurrent" denotes the reverse flow direction.

BACKGROUND OF THE INVENTION

So-called PSA plants, that is to say plants for implementing the PSA cycles mentioned above, are enjoying increasing success, in particular in the fields of purifying hydrogen, treating natural gas, separating the gases in air, recovering solvents, and fractionating synthesis gas.

This success is leading PSA plant manufacturers to construct plants which, although they perform better, are also becoming increasingly complex.

This can be seen from the fact that the plants comprise a plurality of adsorbers with which a large number of valves are associated.

Thus, for example, a PSA plant described in document U.S. Pat. No. 4,834,780 comprises six adsorbers and thirty-seven valves, and another described in document U.S. Pat. No. 4,475,929 comprises ten adsorbers and sixty-seven valves.

Given that proper running of the cycle depends on the sequences of opening and closing these valves which make it possible to obtain the intended pressure cycle, it can therefore readily be seen that malfunction of one of these valves which are operated on each cycle can cause serious problems in the operation of a PSA plant.

By way of example, two cases of malfunction affecting the valves should in particular be highlighted:

1) A first malfunction may consist in mechanical obstruction of the valve, with the result that the valve remains closed in spite of an opening instruction which is applied (or vice versa), or it opens and closes only very slowly.

Such incidents can be detected by end of travel sensors installed in the valves and, where appropriate, connected to timer systems.

Furthermore, given that this type of malfunction generally causes significant imbalances in the pressure cycle of the various adsorbers, such an incident is relatively easy to identify.

2) A second malfunction may result from a sealing defect of a closed valve, which leads to internal leaks either between the adsorbers or between an adsorber and the production line or the residue line.

Unlike mechanical obstruction, leaks in a closed valve which is not leaktight are difficult to detect on a unit which is in operation.

They nevertheless cause a drop in performance of the PSA plant, due to imbalanced operation of the adsorbers or due directly to a loss of production to the residual gas line.

In order to identify the valves which have a sealing defect in the closed position, periodic maintenance shutdowns are conventionally employed to carry out seal tests.

However, this type of inspection has the drawback that it is time-consuming and laborious. Furthermore, in view of the durations of the plant shutdown, these inspections can be carried out only at distant time intervals.

However, given that this loss of production which is caused by a sealing defect of a valve and leads to a few % drop in the extraction efficiency can last several months, the losses may be significant.

SUMMARY OF THE INVENTION

The object of the invention is to overcome these various drawbacks by providing a process which makes it possible to detect a sealing defect of a valve during an operating cycle of a PSA plant.

To that end, the invention relates to a process for separation of a gas mixture by pressure swing adsorption, in which a pressure swing cycle comprising a sequence of steps which define adsorption, decompression/regeneration and pressure rise phases is employed for the or each adsorber, characterized in that the cycle furthermore comprises at least temporarily at least one step of isolating the adsorber during which the pressure variation in the isolated adsorber is recorded.

The process according to the invention may furthermore have one or more of the following characteristics:

the isolation step is carried out at a pressure intermediate between the high pressure and the low pressure of the cycle, the recorded pressure variation is compared with a predefined threshold, and a warning is emitted when the pressure variation exceeds the predefined threshold, the duration of the isolation step is between 0.5% and 5% of the total duration of the cycle, the duration of the isolation step is more than 5 seconds and preferably between 10 and 20 seconds, the step of isolating an adsorber is carried out between two steps of balancing pressures between adsorbers, the isolation step is carried out after a first step of cocurrent decompression of the adsorber and before an elution step, in particular immediately after the first cocurrent decompression step, the isolation step is carried out after first recompression step and before the final recompression step of an adsorber, in particular immediately before the latter, the difference between the high pressure and the low pressure of the cycle is greater than or equal to 6 bar, preferably greater than or equal to 10 bar.

The invention furthermore relates to a unit for separation of a gas mixture by pressure swing adsorption, comprising at least one adsorber and means for implementing in it a pressure swing cycle comprising a sequence of steps which define adsorption, decompression/regeneration and pressure rise phases, characterized in that it furthermore comprises means for isolating the or each adsorber and means for recording the pressure variation in the isolated adsorber.

The unit according to the invention may furthermore have the characteristic according to which it furthermore comprises means for comparing the recorded pressure variation with a predefined threshold stored in a memory and, controlled by the comparison means, means for emitting a warning when the pressure variation exceeds the predefined threshold.

The invention furthermore relates to the application of the process as described above to the purification of hydrogen in a gas mixture, in particular a mixture comprising two or more different gases in the group $H_2$, $N_2$, $CO$, $CH_4$, $CO_2$, to the purification of helium in a gas mixture, in particular a mixture comprising two or more different gases in the group He, $N_2$, $O_2$ and Ar, or to the separation of air.

BRIEF DESCRIPTION OF THE DRAWINGS

Other characteristics and advantages of the invention will emerge from the following description which is given by way of example, without implying any limitation and with reference to the appended figures, in which.

DETAILED DESCRIPTION OF THE INVENTION

Figure 1:
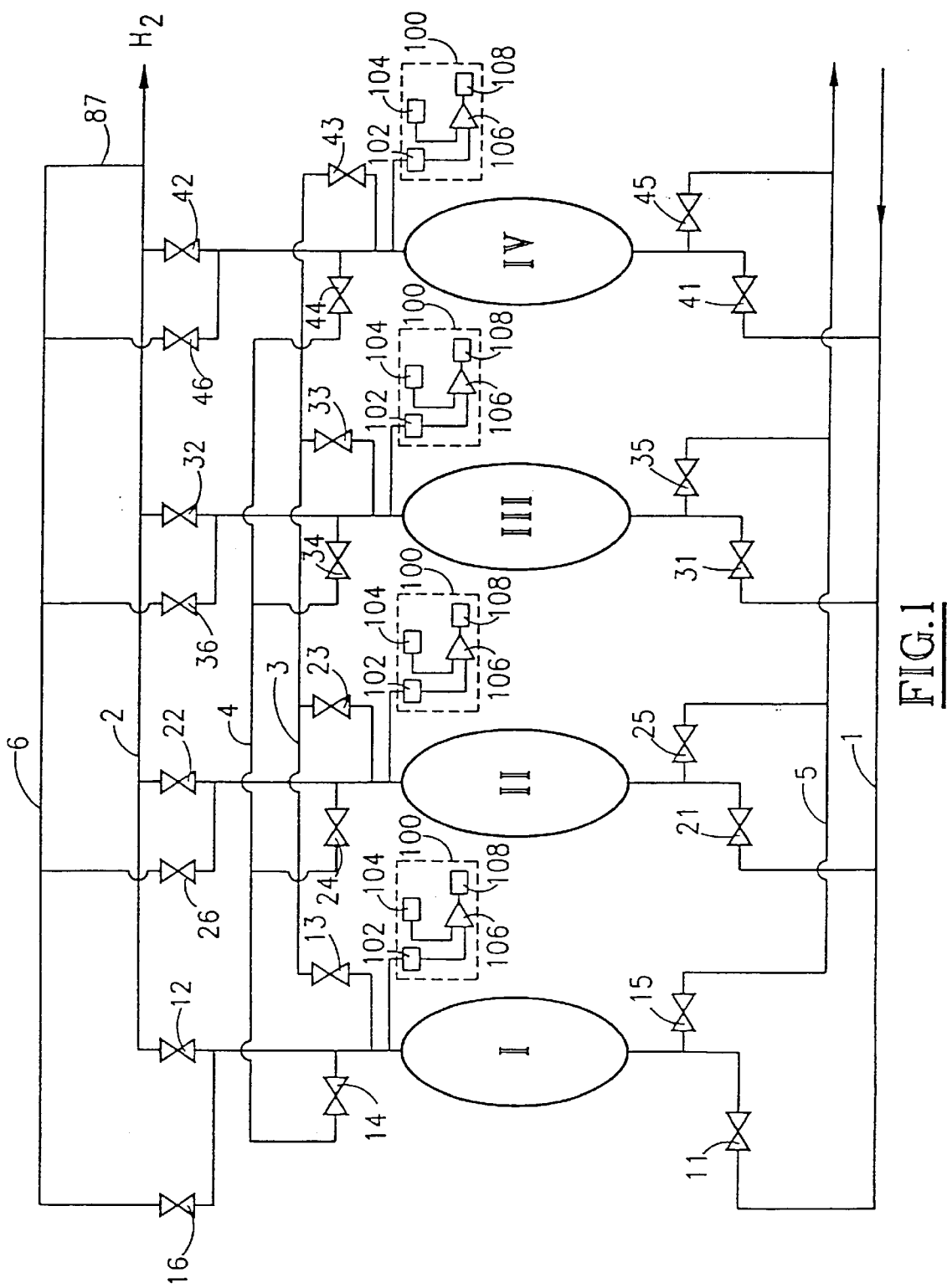
FIG. 1 schematically represents a plant according to the invention.

The plant represented in FIG. 1 is a unit intended to produce hydrogen under a relatively high pressure, typically of the order of 15 to 30 bar.

This production is carried out by selective adsorption from a feed gas mixture, using four adsorbers respectively having the references I, II, III and IV. The feed gas is, for example, a steam reforming synthesis gas and is delivered at constant flow rate by a feed conduit 1 to which the inlet of each adsorber I to IV is connected by means of a respective control valve 11, 21, 31, 41.

The outlet of each adsorber I to IV is connected by means of a respective control valve 12, 22, 32 and 42 to a hydrogen production conduit 2.

Furthermore, the outlet of each adsorber I to IV is connected, on the one hand, by means of a respective control valve 13, 23, 33 and 43, to a conduit 3 for balancing pressures between the adsorbers and, on the other hand, by means of a respective control valve 14, 24, 34 and 44, to an elution conduit 4.

The term "balancing pressures between the adsorbers" is intended to mean gas transfer between the adsorbers in order to balance the pressures prevailing in these adsorbers. This balancing may be either total, so that at the end of the balancing the pressure in the two communicating adsorbers is equal, or partial so that at the end of balancing the pressure in the two communicating adsorbers is different.

The plant furthermore has a conduit 5 for discharging the residual gas, to which the inlet of each adsorber I to IV is connected by a respective control valve 15, 25, 35 and 45.

Lastly, the plant comprises a third conduit 6 for balancing pressures between the adsorbers, to which the outlet of each adsorber I to IV is connected by a respective control valve 16, 26, 36 and 46. This third conduit 6 is a final recompression conduit. To that end, it is connected by a branch 87 to the production conduit 2.

Furthermore, the outlet of each adsorber I, II, III, IV is connected to an associated monitoring unit 100.

Each monitoring unit 100 comprises means 102 which are intended to record the pressure variation and are formed, for example, by a pressure sensor, a memory 104 containing a predefined pressure variation threshold, means 106 for comparing the recorded pressure variation with the stored threshold and, controlled by the comparison means 106, means 108 for emitting a warning when the pressure variation exceeds the stored threshold.

Figure 2:
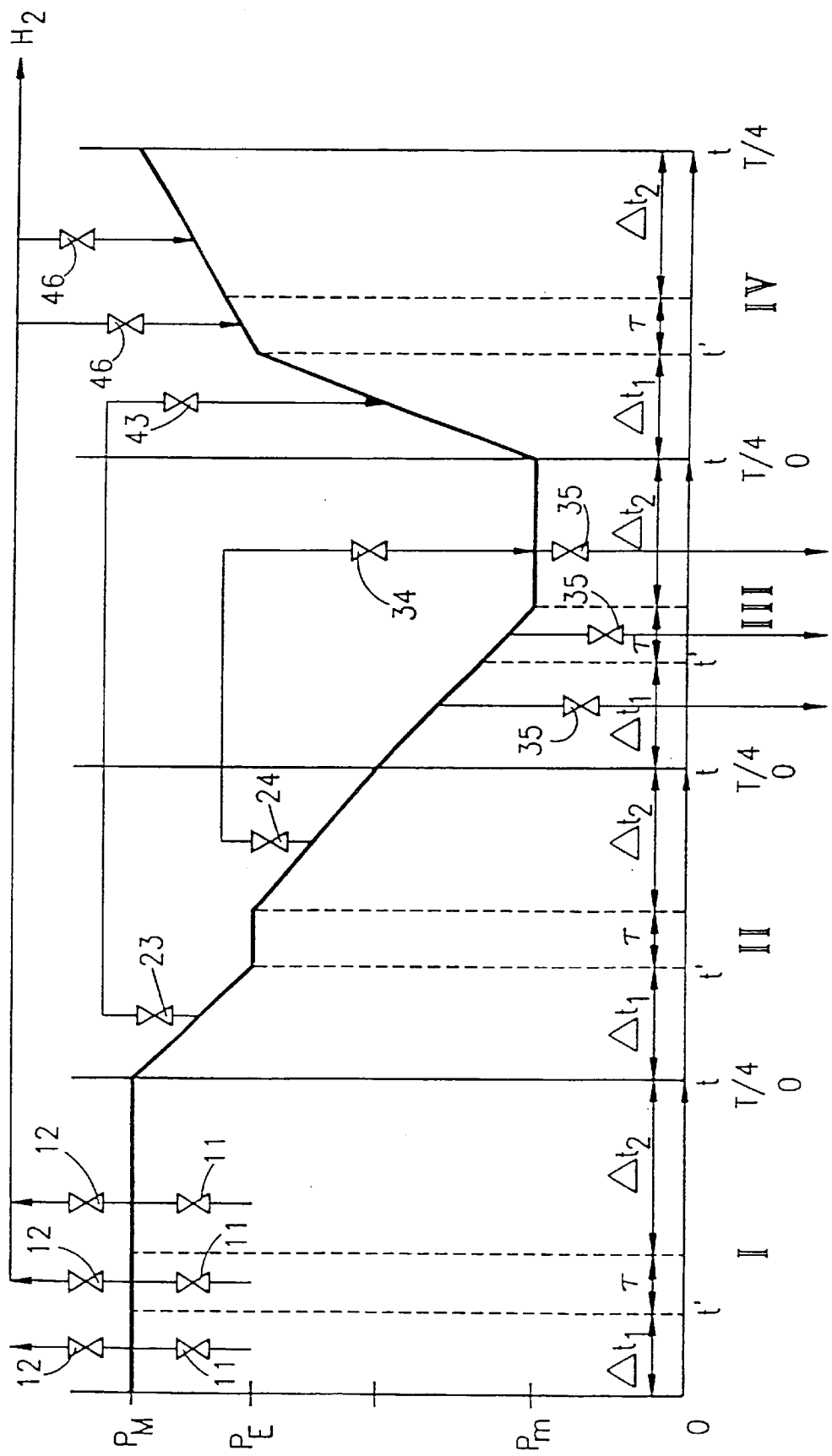
FIG. 2 is a diagram illustrating the process of the invention implemented using the plant in FIG. 1.

The plant furthermore comprises various command and control means (not shown) which are well known in the art and are designed for implementing the pressure swing adsorption (PSA) cycle illustrated in FIG. 2.

This FIG. 2, where the time t is plotted on the abscissa and the absolute pressures P on the ordinate, the lines directed by arrows indicate the movements and destinations of the gas streams.

For each adsorber I to IV, a quarter of a complete cycle has been represented, that is to say between t=0 and t=T/4, and the diagrams for adsorbers I to IV are represented beside one another.

In this figure, when the arrows are parallel to the ordinate axis, they furthermore indicate the direction of flow in an adsorber: when an arrow is in the direction of increasing ordinate (upwards in the diagram), the direction of the stream in the adsorber is cocurrent. If the arrow directed upwards is situated below the line indicating the pressure in the adsorber, the stream enters the adsorber through the inlet end of the adsorber; if the arrow directed upwards is situated above the line indicating the pressure, the stream leaves the adsorber through the outlet end of the adsorber, the inlet and outlet ends being respectively those for the gas to be treated by the adsorber in question and for the gas drawn from this same adsorber in the adsorption phase. When an arrow is in the direction of decreasing ordinate (downwards in the diagram), the direction of the stream in the adsorber is countercurrent. If the arrow directed downwards is situated below the line indicating the pressure of the adsorber, the stream leaves the adsorber through the inlet end of the adsorber; if the arrow directed downwards is situated above the line indicating the pressure, the stream enters the adsorber through the outlet end of the adsorber, the inlet and outlet ends still being those for the gas to be treated and for the gas drawn off in the adsorption phase.

Furthermore, valve symbols with their reference numbers have been represented on the arrows. These valves correspond to the valves of the plant in FIG. 1. When such a symbol is drawn on an arrow, this signifies that the indicated valve is in the open state and the gas flows through it.

In the example in question, the high pressure PM of the cycle is of the order of 27 bar and the low pressure Pm of the cycle is close to 1.7 bar.

The phase time T/4 is for example 180 s.

It should be noted that, for the sake of clarity in the drawing, the proportions of the pressures have not been respected in FIG. 2.

In order to explain the gas flows in the plant which take place at the same time, the first quarter of the complete cycle will be described with reference to adsorber I, that is to say between a time t=0 and a time t=T/4 where T is the duration of a complete cycle, the second quarter cycle with reference to adsorber II, the third quarter with reference to adsorber III and the last quarter cycle with reference to adsorber IV. In order to obtain a complete cycle for a single adsorber, it is necessary merely to join together the quarter cycles of the other adsorbers. For example, in order to obtain the complete cycle of adsorber I, the steps of the cycle between 0 and T/4 have the cycle steps of adsorber II between T/4 and T/2, those of adsorber III between T/2 and 3T/4, and those of adsorber IV between 3T/4 and T joined to them. A cycle is thus obtained which is identical for all the adsorbers, but shifted in time by T/4, T/2 and 3T/4 respectively.

Furthermore, each quarter cycle is subdivided into three periods with respective durations $\Delta t_1$ (between t=0 and t=t'), $\tau$ and $\Delta t_2$ (between t=t'+$\tau$ and t=T/4), the sum of the three periods being equal to T/4.

Cycle Steps During $\Delta t_1$

Adsorber I

During period $\Delta t_1$, valve 11 is in the open state and adsorber I is in a first cocurrent adsorption step, in which the gas mixture to be treated is introduced via conduit 1 and to the inlet of adsorber I at close to the pressure PM and flows in countercurrent through it. Furthermore, valve 12 is in the open state so that the production hydrogen is drawn off at the outlet of adsorber I and sent to the production conduit 2.

Adsorbers II and IV

During $\Delta t_1$, adsorber II undergoes a step of first cocurrent decompression by balancing pressures with adsorber IV in a phase of first countercurrent recompression. To that end, valve 23 is in the open state, so that hydrogen drawn off from adsorber II flows in conduit 3 and, by means of valve 43, in adsorber IV.

During this step, the pressure of adsorber II falls from PM to an intermediate value PE, referred to as the balancing pressure. Similarly, the pressure of adsorber IV rises from Pm to the intermediate value PE.

Adsorber III

During $\Delta t_1$, adsorber III undergoes a countercurrent decompression step, in which valve 35 is in the open state and the gas drawn off from the inlet of adsorber III is discharged via conduit 5.

Cycle Steps During $\tau$

Adsorbers I and IV

During period $\tau$, adsorber I is in a second cocurrent adsorption step, which differs from the previous one during $\Delta t_1$ only by the fact that a hydrogen flow taken from the production conduit 2 is sent, via the valve 46 in the open state, in countercurrent into the adsorber IV at the end of the final recompression step from PE to PM.

Adsorber II

After the first decompression step, during $\Delta t_1$, adsorber II is isolated for a time $\tau$, that is to say all the valves 21 to 26 associated with adsorber II are in the closed state.

During this isolation step, of duration $\tau$, where $\tau$ is between 0.5% and 5% of the total duration of the cycle, the pressure variation in adsorber II is recorded and, using the means 106, the recorded pressure variation is compared with the predefined threshold stored in the memory 104.

If all the valves 21 to 26 associated with adsorber II are leaktight in the closed state, the pressure variation of the isolated adsorber II is zero and the pressure diagram shows a dead level.

However, if one or more of the valves 21 to 26 associated with the adsorber exhibits a sealing defect, the pressure variation of the isolated adsorber II is non-zero and the pressure diagram shows a degree of slope. If such a recorded pressure variation exceeds the threshold stored in the memory 104, the means 106 instruct the means 108 to emit a warning in order to alert an operator in charge of monitoring the operation of the plant.

Preferably, the duration of the step of isolating an adsorber is more than 5 seconds and preferably between 10 and 20 seconds.

Given that the adsorbers I to IV are isolated successively during an operating cycle, the sealing status of all the valves of the plant can actually be checked without the need for a maintenance shutdown of the PSA plant.

This step of isolation during a time $\tau$ may be provided continuously in a PSA cycle, or only temporarily, for example when the PSA plant is either running at rate of capacity or running at reduced capacity.

Adsorber III

During $\tau$, adsorber III reaches the low pressure Pm of the cycle, valve 35 is in the open state and the gas drawn off from the inlet of adsorber III is discharged via the conduit 5.

As a variant, provision is made to leave valve 43 in the open state during the isolation step of duration $\tau$, which makes it possible to check whether or not valve 23 has a sealing defect, because the pressure in conduit 3 will then be higher than the pressure of the isolated adsorber.

Cycle Steps During $\Delta t_2$

Adsorbers I and IV

During period $\Delta t_2$, adsorber I is in a third adsorption step, identical to the previous one during $\tau$, that is to say a hydrogen flow taken from the production conduit 2 is sent, via the valve 46 in the open state, in countercurrent into adsorber IV in the final recompression step from PE to PM.

Adsorbers II and III

During $\Delta t_2$, adsorber II undergoes a second cocurrent decompression step, in which the gas drawn from its outlet is sent in countercurrent into adsorber III in the elution phase.

To that end, valve 24 is in the open state, so that hydrogen drawn from adsorber II flows by means of conduit 4 into adsorber III, in the elution phase.

Valve 35 remains in the open state and the gas drawn from the inlet of adsorber III is discharged via the conduit 5.

Figure 3:
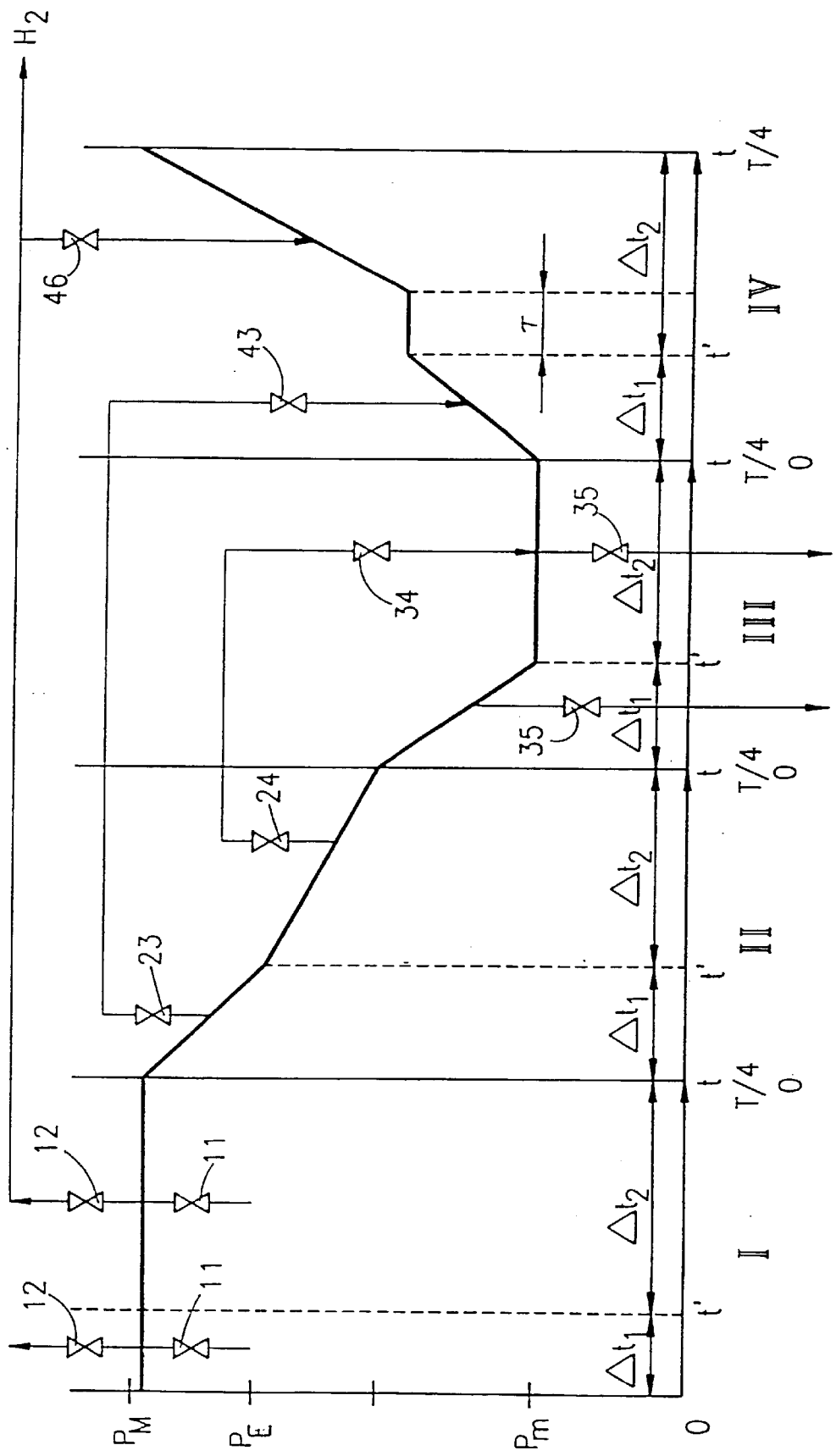
FIG. 3 schematically represents a variation of the process according to the invention.

FIG. 3 shows a variant of the process represented in FIG. 2. This variant differs by the fact that, during $\Delta t_2$, it is adsorber IV which, after a first recompression step during $\Delta t_1$ and before the final recompression step, is isolated in order to make it possible to record the pressure variation by the means 104 in order to check the sealing status of the associated valves 41 to 46. The final recompression step lasts $\Delta t_2 - \tau$.

Furthermore, the isolation step may also be inserted during a phase when an adsorber is at the pressure $P_M$ or at the pressure $P_m$. However, this is not recommended because, in this case, sealing defects respectively to the high pressure and low pressure networks cannot be detected.

Of course, the invention also applies to plants having a number of adsorbers other than four and/or having more than one operation of balancing pressures between the adsorbers during the decompression. It also applies to plants which, for example, use buffer tanks for balancing pressures between two adsorbers. These buffer tanks may also be equipped with pressure sensors in order to detect pressure variations indicating a sealing defect of one or more valves during an isolation step.

Furthermore, the process may equally well be applied to the purification of hydrogen with a PSA cycle having a difference between the high pressure $P_M$ and the low pressure $P_m$ of more than 6 bar and to the purification, for example, of helium with a PSA cycle having a difference between the high pressure $P_M$ and the low pressure $P_m$ of more than 10 bar.

Moreover, the process according to the invention may also be applied to the separation of gas mixtures comprising two or more different gases from the group $H_2$, $N_2$, CO, $CH_4$, $CO_2$ or alternatively gas mixtures comprising two or more different gases from the group He, $N_2$, $O_2$ and Ar.

Furthermore, as a variant, provision is made to equip the conduits 3 and 4 of the PSA unit in FIG. 1 with pressure sensors making it possible to detect more easily leaks due to a sealing defect of a valve.

It will moreover be noted that, for an adsorber of given volume, the pressure variation due to a sealing defect is all the more significant during an isolation step and, consequently, application of the process according to the invention is all the more advantageous when:

the duration of the isolation step is long, the pressure difference between the various conduits of the plant is large during the isolation step, and/or the adsorbability of the main constituent(s) of the gas mixture is low.

What is claimed is:

1. Process for separation of a gas mixture by pressure swing adsorption in at least one adsorber, in which a pressure swing cycle comprising a sequence of steps which define adsorption, decompression/regeneration, and recompression phases is employed for the adsorber, and wherein the cycle further comprises at least temporarily at least one step of isolating the adsorber during which a pressure variation in the isolated adsorber is recorded.

2. The process according to claim 1, wherein the isolation step is carried out at a pressure intermediate between a high pressure and a low pressure of the cycle.

3. The process according to claim 2, wherein the difference between the high pressure and the low pressure of the cycle is greater than or equal to 6 bar.

4. The process according to claim 3, wherein the difference between the high pressure and the low pressure of the cycle is greater than or equal to 10 bar.

5. The process according to claim 1, wherein the recorded pressure variation is compared with a predefined threshold, and a warning is emitted when the pressure variation exceeds the predefined threshold.

6. The process according to claim 1, wherein the duration of the isolation step is between 0.5% and 5% of the total duration of the cycle.

7. The process according to claim 1, wherein the duration of the isolation step is more than 5 seconds.

8. The process according to claim 7, wherein the duration of the isolation step is between 10 and 20 seconds.

9. The process according to claim 1, wherein the step of isolating an adsorber is carried out between two steps of balancing pressures between adsorbers.

10. The process according to claim 1, wherein the decompression/regeneration phase includes a first step of cocurrent decompression and an elution step, and the isolation is carried out after the first step of cocurrent decompression of the adsorber and before the elution step.

11. The process according to claim 1, wherein the recompression phase includes a first recompression step and a final recompression step, and the isolation step is carried out after the first recompression step and before the final recompression step of an adsorber.

12. The process according to claim 1, wherein the gas mixture to be separated comprises two or more different gases selected from the group consisting of $H_2$, $N_2$, CO, $CH_4$, and $CO_2$.

13. The process according to claim 1, wherein the gas mixture comprises two or more different gases selected from the group consisting of He, $N_2$, $O_2$ and Ar.

14. The process according to claim 1, wherein the gas mixture is air.

15. Unit for separation of a gas mixture by pressure swing adsorption, comprising at least one adsorber and means for implementing in said adsorber a pressure swing cycle comprising a sequence of steps which define adsorption, decompression/regeneration, and pressure rise phases; said unit further comprising means for isolating the adsorber; and means for recording a pressure variation in the isolated adsorber.

16. The unit according to claim 15, further comprising comparison means for comparing the recorded pressure variation with a predefined threshold stored in a memory and, controlled by the comparison means, means for emitting a warning when the pressure variation exceeds the predefined threshold.

* * * * *